United States Patent [19]

Kanda et al.

[11] Patent Number: 5,011,711
[45] Date of Patent: Apr. 30, 1991

[54] METHOD FOR POST-TREATMENT OF ELECTROPLATED STEEL SHEETS FOR SOLDERING

[75] Inventors: Katsumi Kanda; Junichi Fujimoto; Masashi Ichishima; Takao Nishimura; Yoshikazu Kondo, all of Yamaguchi, Japan

[73] Assignee: Toyo Kohan Co., Ltd., Chiyoda, Japan

[21] Appl. No.: 379,172

[22] Filed: Jul. 13, 1989

[51] Int. Cl.$^5$ .......................... B05D 3/04; B05D 3/10
[52] U.S. Cl. ..................... 427/334; 204/35.1; 204/38.1; 427/404; 427/416; 427/417
[58] Field of Search ............. 427/118, 388.1, 388.2, 427/402, 404, 416–418, 334; 204/35.1, 38.1

[56] References Cited

U.S. PATENT DOCUMENTS 4,876,116 10/1989 Mehan et al. .............. 427/388.1 X

Primary Examiner—Michael Lusignan
Attorney, Agent, or Firm—Felfe & Lynch

[57] ABSTRACT

Electroplated steel sheet suitable for soldering is provided by coating the plated steel sheet with a post-treatment solution in the range of 0.01 to 2 um in dry thickness. The post-treatment solution contains from 2 to 200 g/liter of at least one water-soluble or water-dispersed materials other than phosphoric esters, and/or from 5 to 200 g/liter of phosphoric esters, and also contains from 2 to 100 g/liter of at least one water-soluble or water-dispersable organic fluoro compound. The post-treatment solution may further contain from 0.01 to 3 g/liter of $Cr^{6+}$ ion, and/or from 10 to 100 g/liter of organic amine soap. A suitable pH value of the post-treatment solution is between 3 and 10.

25 Claims, 6 Drawing Sheets

United States Patent Office

PTO - BOYERS, PA Duty Station

MISSING PAGE TEMPORARY NOTICE

PATENT # _5011711_ FOR ISSUE DATE _4-30-91_

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

_ALL DWGS._

N/A at Boyers
7/30/92

Data Conversion Operation
Boyers, Pa

METHOD FOR POST-TREATMENT OF ELECTROPLATED STEEL SHEETS FOR SOLDERING

FIELD OF THE INVENTION

The present invention relates to the post-treatment of a plated steel sheet for soldering and especially to the post-treatment solution whose use results in excellent wettability and adhesive strength to solder, hereafter referred to as solderability, as well as excellent corrosion resistance, formability and durability.

BACKGROUND OF THE INVENTION

Recently Sn plated steel sheet, Pb-Sn plated steel sheet, Cu plated steel sheet or Zn plated steel sheet have been used as a plated steel sheets suitable for soldering. However, these plated steel sheets easily corrode during packing or after assembling unless they are post-treated. Therefore, post-treatments such as chromate treatment, phosphate treatment or coating of anti-corrosion primer are applied on said steel sheets.

Chromate treatment is not satisfactory because more than 0.1 mg/dm$^2$ of $Cr^{6+}$ ion is necessary in order to provide sufficient corrosion resistance. However, if more than 0.05 mg/dm$^2$ of $Cr^{6+}$ is used, a strong flux is necessary for soldering. The use of strong flux causes deterioration of the working environment and decrease of corrosion resistance of the soldered surface. Therefore, the amount of $Cr^{6+}$ has to be limited to less than 0.05 mg/dm$^2$, which does not provide sufficient corrosion resistance.

On the other hand, the application of an anti-corrosion primer causes decrease of solderability similar to chromate treatment and also becomes easily soiled by handling at bending or soldering. Moreover, corrosion resistance of soiled areas after soldering is less satisfactory than in other areas.

In order to provide a plated steel sheet for soldering, it is important to apply on the plated steel sheet after plating a suitable post-treatment which does not detract from solderability and which increases the corrosion resistance.

However, use of the post-treatment methods of the prior art cannot provide a plated steel sheet excellent in corrosion resistance and solderability because solderability and corrosion resistance show contrary tendency to each other. This tendency becomes apparent after aging, because the oxide film on the plated steel sheet increases with passage of time and decreases the solderability.

In view of the facts described above, it is necessary to improve the post-treatment after plating. There is some prior art relating to a process for production of plated steel sheet for soldering, for example, Japanese Patent Application Laid-Open No. Sho 63-88085, Japanese Patent Application Laid-Open No. Sho 63-115670, and Japanese Patent Application Laid-Open No. Sho 63-224769. These prior art processes have exhibited superior properties by coating post-treatment substances onto the plated steel sheet. However, stain resistance and corrosion resistance at stained parts have been insufficient.

We have examined the prior art post-treatment processes in detail to solve the problems mentioned above and developed the present invention.

By coating the present post-treatment solution onto the plated steel sheets, not only solderability and corrosion resistance but also resistance to finger printing and corrosion resistance of the finger-printed areas have increased.

SUMMARY OF THE INVENTION

The electroplated steel sheet is coated with a post-treatment solution in the range of 0.01 to 2 μm in dry thickness. The post-treatment solution contains from 2 to 100 g/liter of at least one water-soluble or water-dispersed main component material such as:
a. condensates prepared from fatty higher alcohols, alkylphenols or fatty acids with ethylene oxides,
b. polyethylene glycol alkylamines,
c. esters prepared from sorbitan and fatty acids,
d. surfactants prepared from polypropylene glycols (as a hydrophobic group) and polyethylene glycols (as a hydrophilic group),
e. amides prepared from fatty acids and diethanol amines,
f. esters prepared from fatty acids and sucrose,
g. saponificates prepared from lanolin alcohol or lanolin fatty acids,
h. abietic acid,
i. benzoic acid,
j. saturated fatty acids having 12 to 24 carbon atoms,
k. unsaturated fatty acids having 12 to 24 carbon atoms.
l. alcohols having 2 to 400 carbon atoms,
m. esters prepared from fatty acids and glycerol,
n. derivatives of benzotriazoles,
o. metalates, amonium salts and amine salts of materials h. through n.,
p. paraffin waxes, and/or from 5 to 200 g/liter of
q. phosphoric esters.

Into the solution containing at least one of the materials mentioned above, at least one water-soluble or water-dispersed organic fluoro compound must be mixed at the concentration from 2 to 100 g/liter.

The post-treatment solution may further contain chromium ion in concentration of from 0.01 to 3 g/liter and/or organic amine soap in concentration of from 10 to 100 g/liter. The pH value of the post-treatment is in the range of between 3 and 10.

DETAILED DESCRIPTION OF THE INVENTION

In the main components of the present invention, water-soluble or water-dispersed fatty higher alcohols, alkylphenols and condensates prepared from fatty higher alcohols, and alkylphenols or fatty acids with ethylene oxides include polyethylene glycol alkyl ether, polyethylene glycol alkylphenyl ether and polyethylene glycol fatty acid esters. Polyethylene glycol alkylamines include N-polyethylene glycol alkyl amine and polyethylene glycol alkyl amine ether. Esters prepared from sorbitan and fatty acid include sorbitan fatty acid ester and polyethylene glycol sorbitan fatty acid ester. Surfactants prepared from polypropylene glycol (as hydrophobic group) and polyethylene glycol (as hydrophilic group) include polypropylene glycol polyethylene glycol ether. Amides prepared from fatty acids and diethanol amines include fatty acid diethanol amide. Esters prepared from fatty acids and sucrose include sucrose fatty acids ester. Saponificates prepared from lanolin alcohol or lanolin fatty acids include polyoxyethylene lanolin alcohol ether and polyoxyethylene lanolin fatty acid ester.

Water-soluble or water-dispersed organic acids which are utilized as solder flux without halogen include abietic acid, benzoic acid, saturated fatty acids which contain from 12 to 24 carbon atoms such as stearic acid, lauric acid and palmitic acid and unsaturated fatty acid such as oleic acid. Alcohols include glycerol, diols and polyethylene glycol. Esters include fatty acid glycerol esters. Derivates of benzotriazoles include benzotriazole azimidazole and 1-N-benzoylbenzotriazole. Waxes include paraffin wax of molecular weight between 300 to 500 which contain as a main component straight-chain saturated hydrocarbons having from 20 to 30 carbon atoms. Water soluble or water dispersed phosphoric esters include monobasic or dibasic phosphoric acids with one or two alkyl groups or soaps of organic amines. If the alkyl groups of phosphoric esters are large and less soluble in water, it is possible to combine ethylene oxide or neutralize with alkali in order to improve the hydrophilic property.

Concentration of the main component material is preferably from 2 to 100 g/liter, except for phosphoric ester which is preferably from 5 to 200 g/liter. The effects of the present invention are basically controlled by the amount of the post-treatment material coated on the plated steel sheet and are not influenced by the concentration of the post-treatment solution. However, the above-mentioned concentrations are preferred in the present invention in order to facilitate operation. Halogen ions are not preferred because they decrease the corrosion resistance.

Water-soluble or water-dispersed organic fluoro compounds include perfluoroalkyl groups and have the following formula:

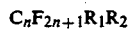

$$C_nF_{2n+1}R_1R_2$$

where $R_1$ is methylene, ethylene or a direct bond;

$R_2$ (which is introduced to increase the water-solubility or water-dispersibility) is a radical of acrylic esters, methacrylic esters, phosphoric esters, or carboxylic esters or an ethylene oxide adduct; and n is an integer from 2 to 30.

For the purpose of dissolving or dispersing organic fluoro compounds, it is possible to add emulsifier, surfactant or organic solvent into the solution.

It is possible to replace up to about one-third of the fluorine atoms in the perfluoroalkyl group with hydrogen atoms. The number of the carbon atoms in the group $C_nF_{2n+1}$ is preferably from 2 to 30. If it is under 2, resistance to finger prints becomes inferior; and if it is over 30, solderability becomes inferior.

In the above formula, $R_2$ is preferably a radical of an acrylic, methacrylic or phosphoric ester.

Concentration of the organic fluoro compounds is preferably from 2 to 100 g/liter. If it is under 2 g/liter, it has no effect on resistance to finger prints; and if it is over 100 g/liter, solderability becomes inferior.

In order to stabilize the post-treatment solution and improve the corrosion resistance and abrasion resistance, $Cr^{6+}$ ions and/or soaps of organic amines or mixture of them can be utilized.

Concentration of the $Cr^{6+}$ ions over 3 g/liter remarkably decreases solderability and is not preferred. Soaps of organic amines contain dodecylamine, oleoylimidazoline, aminopropyl beef tallow amine and rosin amine. The amine may be used as a salt with carbonic acid. A concentration of the amine over 100 g/liter exhibits some effect on corrosion resistance, but shows negative effect on solderability and is not preferred.

Furthermore, well-known water-soluble or water-dispersed anti-corrosion agents are available. In this case, however, it is important to control the amount of addition in order not to decrease the solderability. For example, addition of acrylic emulsion increases the abrasion resistance but also decreases the solderability.

The preferred pH value of the solution is between 3 and 10. If it is under 3, the stability of the solution decreases. If it is over 10, drying properties of the post-treatment solution decrease.

The temperature of the post-treatment is not limited. However, at temperatures over 80° C., stability of the post-treatment decreases and the solution tends to gelatinize. An ordinary temperature range between 20° and 40° C. is preferred and economical.

Coating methods of the post-treatment are not restricted. Roll-coating, knife-coating or dipping followed by wringer roll or air-knife are applicable. Degree of the dryness is not restricted but tacky post-treatment material is not acceptable. A residue of even small amounts of water will cause corrosion after aging.

The preferred thickness of the post-treatment material is between 0.01 and 2 μm by dry thickness. If it is under 0.01 μm, it has no effect on corrosion resistance. If it is over 2 μm, corrosion resistance is superior but solderability becomes inferior and the coating process becomes more complicated owing to the thickness of the coat.

The post-treatment material of the present invention can be applied on Sn plate, Pb-Sn plate, Zn plate, Zn-alloy plate or composite plated steel sheet with these elements.

Such steel sheets treated with the post-treatment material of this invention exhibit not only superior solderability but also resistance to finger prints and corrosion. Moreover, solderability and corrosion resistance after aging are also superior.

The reason why the properties of the coated steel sheet of the present invention are improved has not been determined. However, formation of oxides, hydroxides and carbonates are inhibited by coating the present post-treatment material on said plated steel sheet. It is believed that since the present post-treatment dissolves or reduces the metal oxides which have formed on the plated steel sheet overtime, the wetting and diffusion of solder are promoted and solderability is improved. According to said phenomenon, the present post-treatment film covers the plated steel sheet uniformly and increases corrosion resistance.

By coating the present post-treatment solution onto the plated steel sheet uniformly, plated steel sheets have excellent solderability and corrosion resistance can be continuously produced.

Specific embodiments of the present invention are as follows:

EXAMPLE 1

A cold-rolled steel sheet of 0.5 mm thick was used as the substrate and was treated by ordinary alkali cleaning and pickling. After water spraying, the substrate was electro-plated in a sulfuric acid bath at the coating weight of 5 g/m² of Zn deposit and was treated in accordance with the present invention. In this regard, a post-treatment solution containing monobasic phosphoric ester 100 g/liter, tetrafluoro-propyl methacrylate 10 g/liter and $CrO_3$ 0.01 g/liter (as $Cr^{6+}$ ion) was coated on the Zn plated steel sheet by a dipping method and the thus-coated steel sheet was dried at the temperature at 60° C. to form a coating film of 2.0 μm in dry thickness thereon.

Examples 2–10 of the present invention were treated according to the same procedure as example 1, except for the type and amount of the deposit and post-treatment.

COMPARATIVE EXAMPLE 1

The same substrates as in Example 1 were treated by ordinary alkali cleaning and picking. After water spraying, the substrate was electroplated in a sulfuric acid bath at the coating weight of 5 g/m² of Zn deposit and was post-treated in an ordinary chromate bath, that is, chromic acid anhydrate 20 g/liter, sulfuric acid 0.05 g/liter, bath temperature 30° C., by dipping for one second at the coating weight of Cr of 0.05 mg/dm². After drying, the comparative example was produced.

Comparative examples 2–10 were also electroplated according to ordinary methods and post-treated according to the ordinary methods.

The conditions for the post-treatments are summarized in Table 1 and the evaluation of properties is summarized in Table 2.

As shown in Table 2, the post-treatment solution of the present invention have excellent effects on corrosion resistance, solderability, resistance to finger prints and aging tests.

Comparative examples 1–4, 5, and 6–10 were post-treated by chromate or phosphate treatment, by non-treatment, or by post-treatment according to other methods without organic fluoro compounds, respectively. The comparative examples have exhibited corrosion resistance but have inferior solderability effects resulting in the inferior solder wettability. Furthermore, the colour of the surface of the examples has changed and corrosion resistance has decreased after aging tests. Comparative examples 6–10 have also shown inferior resistance to finger printing.

As shown in Examples 1–10, and in Table 1 and 2, excellent corrosion resistance, solderability, resistance to finger printing and formability have been obtained and these properties after aging of the plated steel sheet can be achieved by using the present invention.

TABLE 1

| | | | Preparation and condition of Specimens | | |
|---|---|---|---|---|---|
| Example | Type of plating | Amount of Deposit (g/m²) | Composition of post-treatment solution of present invention (g/l) | | Thickness (μm) |
| 1 | Zn plated | 5 | phosphoric acid 2-ethylhexyl ester | 100 | 2.0 |
| | | | tetra-fluoropropyl methacrylate | 10 | |
| | | | $Cr^{6+}$ | 0.01 | |
| 2 | Zn plated | 10 | phosphoric acid 2-ethylhexyl ester (mixture of mono- and di-) | 200 | 0.5 |
| | | | tri-fluoroethyl methacrylate | 2 | |
| 3 | Sn plated | 2 | phosphoric acid polyethylene glycol stearyl ester (mixture of mono- and di-) | 5 | 0.01 |
| | | | hexa-fluorobutyl methacrylate | 100 | |
| | | | $Cr^{6+}$ | 3 | |
| | | | rosin amine | 10 | |
| 4 | Sn plated | 5 | polyethylene glycol stearate (noniolite-T40: Kyoueisya Yushi Co. LTD) | 5 | 0.2 |
| | | | phosphoric acid polyethylene glycol stearyl ester (mixture of mono- and di-) | 1 | |
| | | | per-fluorobutyl ethyl acrylate | 5 | |
| 5 | Cu plated | 3 | sorbitan oleate (Noniolite-SPS: Kyoueisya Yushi Co. LTD) | 50 | 0.5 |
| | | | phosphoric acid 2-ethylhexyl ester | 50 | |
| | | | $Cr^{6+}$ | 3 | |
| | | | per-fluorobutyl ethyl acrylate | 10 | |
| 6 | Sn-Pb plated | 10 | polyoxyethylene aklylpropylene diamine (Noniolite-DNT 10: Kyoueisya Yushi Co. LTD) | 10 | 0.1 |
| | | | $Cr^{6+}$ | 1 | |
| | | | per-fluorobutyl phosphate | 30 | |
| 7 | Zn plated | 10 | derivative of benzotriazole | 2 | 0.05 |
| | | | salt of phosphoric acid 2-ethylhexyl ester and dodecyl amine | 1 | |
| | | | per-fluorobutyl tri-methyl ammonium salt | 50 | |
| | | | $CrO_3$ | 0.2 | |
| 8 | Sn plated | 2 | paraffin wax | 100 | 3 |
| | | | tri-fluoroethyl methacrylate | 8 | |
| | | | $CrO_3$ | 2 | |
| | | | stearyl tri-methyl ammonium salt | 1 | |
| 9 | Sn plated | 5 | oleic acid | 50 | 0.2 |
| | | | phosphoric acid polyethylene glycol stearyl ester (mixture of mono- and di-) | 10 | |
| | | | ethylene oxide of per-fluorobutyl | 5 | |
| 10 | Cu plated | 3 | ester prepared from stearic acid and glycerol | 20 | 1 |
| | | | paraffin wax | 100 | |
| | | | hydrophilic urethan of per-fluorobutyl | 10 | |

TABLE 1

| | | | Preparation and condition of Specimens | | |
|---|---|---|---|---|---|
| comparative Example | Type of plating | Amount of Deposit (g/m$^2$) | Composition of post-treatment solution of present invention (g/l) | | Thickness (μm) |
| 1 | Zn plated | 5 | chromate treatment | | 0.05 mg/dm$^2$ (as Cr) |
| 2 | Sn plated | 5 | phosphate treatment | | 2 g/m$^2$ (as P) |
| 3 | Sn plated | 5 | chromate treatment | | 0.05 mg/dm$^2$ (as Cr) |
| 4 | Cu plated | 3 | chromate treatment | | 0.05 mg/dm$^2$ (as Cr) |
| 5 | Zn plated | — | — | | — |
| 6 | Sn plated | 5 | mono-(di-oleyl)phosphoric ester amine salt Cr$^{6+}$ | 10 0.1 | 0.1 |
| 7 | Cu plated | 3 | phosphoric acid 2-ethylhexyl ester dodecly amine | 50 100 | 0.5 |
| 8 | Sn-Pb plated | 10 | phosphoric acid 2-ethylhexyl ester alkanol amine salt | 150 | 0.2 |
| 9 | Zn plated | 10 | polypropylene glycol polyethylene glycol ether (Epan-720: Daiichikogyo Seiyaku Co. LTD) phosphoric acid polyethylene glycol stearyl ester (mixture of mono- and di-) | 100 5 | 2 |
| 10 | Sn plated | 2 | polyethylene glycol oleic ester (Noigen SE 90: Daiichikogyo Seiyaku Co. LTD) Cr$^{6+}$ | 10 0.01 | 0.02 |

TABLE 2

| | | Evaluation of properties | | | | | | | | | |
|---|---|---|---|---|---|---|---|---|---|---|---|
| | | Initial properties | | | | | | | Properties after aging tests | | |
| | | Solderability | | | | Resistance to finger print | | | Solderability | | |
| Sample No | Corrosion resistance | Spreadability | Strength | Formability | change of colour | residue of finger print | change of colour | Corrosion resistance | Spreadability | strength | Formability |
| Example | | | | | | | | | | | |
| 1 | O | O | O | O | O | O | O | O | O | O | O |
| 2 | O | O | O | O | O | O | O | O | O | O | O |
| 3 | O | O | O | O | O | O | O | O | O | O | O |
| 4 | O | O | O | O | O | O | O | O | O | O | O |
| 5 | O | O | O | O | O | O | O | O | O | O | O |
| 6 | O | O | O | O | O | O | O | O | O | O | O |
| 7 | O | O | O | O | O | O | O | O | O | O | O |
| 8 | O | O | O | O | O | O | O | O | O | O | O |
| 9 | O | O | O | O | O | O | O | O | O | O | O |
| 10 | O | O | O | O | O | O | O | O | O | O | O |
| Comparative Example | | | | | | | | | | | |
| 1 | Δ~O | X | X | O | Δ~O | X | X | Δ | X | X | O |
| 2 | O | X | X | O | Δ~O | X | X | Δ | X | X | O |
| 3 | X | O | O | O | Δ | X | X | X | X~Δ | X~Δ | O |
| 4 | Δ | O | O | O | X | X | X | Δ | X | X | O |
| 5 | X | O | O | O | X | X | X | X | X | X | O |
| 6 | O | O | O | O | O | X~Δ | X~Δ | O | O | O | O |
| 7 | O | O | O | O | O | X~Δ | X~Δ | O | O | O | O |
| 8 | O | O | O | O | O | X~Δ | X~Δ | O | O | O | O |
| 9 | O | O | O | O | O | X~Δ | X~Δ | O | O | O | O |
| 10 | O | O | O | O | O | X~Δ | X~Δ | O | O | O | O |

EVALUATION

The metal substrates which were prepared in the Examples 1-10 and Comparative examples 1-10 were evaluated by the following test methods. The results are shown in Table 2.

(1) Spreadability of solder: a sample steel sheet, 50×50 mm in size, was floated on the solder-bath at a temperature of 250° C. The amount of 0.4 g of bended wire solder, that is, rosin flux cored solder (JIS Z 3283) was placed on the sample steel sheet for 30 seconds. The area of solder spread was measured after cooling.

O: Area of spread solder ≧ 200 mm$^2$
Δ: 200 mm$^2$ > area of spread solder > 50 mm$^2$
X: Area of spread solder ≦ 50 mm$^2$ (2) Combination strength of solder: a bundle of twenty wires ($\phi$=0.18 mm) was placed on the test steel sheet and joined with the rosin flu solder (RH 50) and was subjected to a pull off test (Bundle of twenty copper wires and soldered steel sheet were pulled in opposite directions and evaluated as to the appearance of separated place).

O: No separation among wire, solder and soldered steel sheet

X: Separation between wire and solder, or solder and soldered steel sheet (3) Corrosion resistance: a sample steel sheet was subjected to 2 cycles of a salt spray test (JIS Z 2371: salt spray 8 hours and dry 16 hours) and evaluated from appearance of red rust.

O: No red rust

X: Entirely red rust (4) Formability: sample steel sheets were subjected to the Erichsen test (Er=7 mm) and Du Pont impact test ($\frac{1}{2}'' \times 1$ kg$\times$30 cm) and were evaluated as to formability by the adhesive tape test.

O: No separation between plated steel sheet and post-treatment

X: Separation between plated steel sheet and post-treatment (5) Aging: sample steel sheets were subjected to a thermohygrostat (60° C., RH 95%) for 1,000 hours and evaluated as to the appearance (or colour change), corrosion resistance and solderability in the same was as in evaluations (1)–(4).

O: No colour change

X: Colour change (6) Resistance to finger print: the substrates were finger printed with artificial sweat (composition: urea 1 g/liter, sodium pyrophosphate 10-hydrate 8 g/liter, lactic acid 4.6 g/liter, acetic acid 5 g/liter, NaCl 7 g/liter, ethyl alcohol 20 ml/liter are adjusted to 1 liter with pure water and to pH=3.75) and evaluated by the change of appearance.

The finger printed substrates were subjected to a thermo-hygrostat (60° C., RH 95%) and evaluated by the change of appearance and colour after 500 hours.

O: Almost no finger print residue, no colour change

Δ: A little finger print residue, a little colour change

X: Obvious finger print residue, almost complete colour change

What we claim is:

1. A method for post-treating plated steel sheet for soldering which comprises the steps of (1) coating said sheet with an aqueous post-treatment solution having a pH of from 3 to 10 and comprising at least one water-soluble or water-dispersible material selected from the group consisting of:
   a. condensates of fatty higher alcohols, alkylphenols or fatty acids with ethylene oxides,
   b. polyethylene glycol-alkylamines,
   c. esters of sorbitan and fatty acids,
   d. surfactants prepared from polypropylene glycol and polyethylene glycol,
   e. amides of fatty acid and diethanol amine,
   f. esters of sucrose and fatty acids,
   g. saponificates of lanolin alcohol or lanolin fatty acid,
   h. abietic acid,
   i. benzoic acid,
   j saturated fatty acids having 12 to 24 carbon atoms,
   k. unsaturated fatty acids having 12 to 24 carbon atoms,
   l. alcohols having 2 to 400 carbon atoms,
   m. esters of fatty acids,
   n. derivatives of benzotriazoles,
   o. metalates, ammonium salts and amine salts of material h. through n.,
   p. paraffin waxes, and
   q. phosphoric esters, said solution containing from 2 to 100 g/liter of any of said materials other than phosphoric esters, and/or from 5 to 200 g/liter of phosphoric esters, and further comprising from 2 to 100 g/liter of at least one water-soluble or water-dispersed organic fluoro compound of the formula $$C_nF_{2n+1}R_1R_2$$

where $R_1$ is methylene, ethylene or a direct bond;

$R_2$ (which is introduced to increase the water-solubility or water-dispersibility) is a radical of acrylic esters, methacrylic esters, phosphoric esters, or carboxylic esters, or an ethylene oxide adduct; and n is an integer from 2 to 30, in which up to one-third of the fluorine atoms can optionally be replaced by hydrogen atoms, and (2) drying said solution to obtain a coating thickness in the range of from 0.01 to 2 μm.

2. A method according to claim 1 in which the post-treatment solution further comprises from 0.01 to 3 g/liter of $Cr^{6+}$ ion.

3. A method according to claim 1 in which the post-treatment solution further comprises from 10 to 100 g/liter of an organic amine soap.

4. A method according to claim 1 in which the post-treatment solution comprises material a. selected from the group consisting of polyethylene glycol alkyl phenyl ether, polyethylene glycol alkyl ether and polyethylene glycol-fatty acid esters.

5. A method according to claim 1 in which the post-treatment solution comprises material b. selected from the group consisting of N-polyethylene glycolalkyl amine and polyethylene glycolalkyl ether.

6. A method according to claim 1 in which the post-treatment solution comprises material c. which is a polyethylene glycolsorbitan fatty acid ester.

7. A method according to claim 1 in which the post-treatment solution comprises material d. which is a polypropylene glycol polyethylene glycol ether.

8. A method according to claim 1 in which the post-treatment solution comprises material e. which is a fatty acid diethanol amide.

9. A method according to claim 1 in which the post-treatment solution comprises material f. which is a sucrose fatty acid ester.

10. A method according to claim 1 in which the post-treatment solution comprises material g. selected from the group consisting of polyoxyethylene lanolin alcohol esters and polyoxyethylene lanolin fatty acid esters.

11. A method according to claim 1 in which the post-treatment solution comprises material h. selected from the group consisting of abietic acid, a methalate, an ammonium salt and an amine salt thereof.

12. A method according to claim 1 in which the post-treatment solution comprises material i. selected from the group consisting of benzoic acid, a metalate, an ammonium salt and an amine salt thereof.

13. A method according to claim 1 in which the post-treatment solution comprises material j. selected from the group consisting of stearic acid, lauric acid and palmitic acid, and a metalate, an ammonium salt and an amine salt thereof.

14. A method according to claim 1 in which the post-treatment solution comprises material k. selected from the group consisting of oleic acid, a metalate, an ammonium salt and an amine salt thereof.

15. A method according to claim 1 in which the post-treatment solution comprises material l. selected from the group consisting of glycerol, ethylene glycol and polyethylene glycol, and a metalate, an ammonium salt and an amine salt thereof.

16. A method according to claim 1 in which the post-treatment solution comprises material m. which is a fatty acid glycerol ester, metalate, ammonium salt or amine salt.

17. A method according to claim 1 in which the post-treatment solution comprises material n. selected from the group consisting of benzotriazole, azimidazole and 1-N-benzoyl-benzotriazole, and a metalate, an ammonium salt and an amine salt thereof.

18. A method according to claim 1 in which the post-treatment solution comprises material p. which is a paraffin wax of molecular weight from 300 to 500 which contains as a main component straight-chain saturated hydrocarbons having from 20 to 30 carbon atoms.

19. A method according to claim 1 in which the post-treatment solution comprises material q. which is a phosphoric ester soap containing organic amines or mono- or di-basic acids having 1 or 2 alkyl groups.

20. A method according to claim 19 wherein ethylene oxide or alkali are added.

21. A method according to claim 1 wherein the organic fluoro compound is selected from the group consisting of tetrafluoropropyl methacrylate, trifluoroethyl methacrylate, hexafluorobutyl methacrylate, perfluoroalkyl ethyl acrylate, perfluorobutyl ethyl acrylate, perfluoroalkyl phosphate, perfluoroalkyl trimethyl ammonium salt, trifluoroethyl methacrylate, ethylene oxide of perfluoroalkyl and hydrophilic urethane of perfluoroalkyl.

22. A method according to claim 2 in which the post-treatment solution comprises material q. which is a phosphoric ester soap containing organic amines or mono- or di-basic acids having 1 or 2 alkyl groups.

23. A method according to claim 2 in which the post-treatment solution comprises sorbitan oleate.

24. A method according to claim 2 in which the post-treatment solution comprises polyoxyethylene alkylpropylamine diamine.

25. A method according to claim 2 in which the post-treatment solution comprises a paraffin wax.

* * * * *